(12) United States Patent
Eiden, III et al.

(10) Patent No.: US 10,618,744 B2
(45) Date of Patent: Apr. 14, 2020

(54) BOX SUPPORT FRAME FOR USE WITH T-BELT CONVEYOR

(71) Applicant: Proppant Express Solutions, LLC, Denver, CO (US)

(72) Inventors: Kenneth W. Eiden, III, Bozeman, MT (US); Timothy Stefan, Bozeman, MT (US); Mark D'Agostino, Bozeman, MT (US); Scott D'Agostino, Bozeman, MT (US); Clint Lohman, Bozeman, MT (US); Marc Kevin Fisher, Castle Rock, CO (US)

(73) Assignee: Proppant Express Solutions, LLC, Denver, CO (US)

( * ) Notice: Subject to any disclaimer, the term of this patent is extended or adjusted under 35 U.S.C. 154(b) by 0 days.

(21) Appl. No.: 15/696,914

(22) Filed: Sep. 6, 2017

(65) Prior Publication Data
US 2018/0065814 A1 Mar. 8, 2018

Related U.S. Application Data

(60) Provisional application No. 62/384,234, filed on Sep. 7, 2016.

(51) Int. Cl.
*B65G 41/00* (2006.01)
*B65G 47/18* (2006.01)
(Continued)

(52) U.S. Cl.
CPC .......... *B65G 41/006* (2013.01); *B65D 88/32* (2013.01); *B65D 88/54* (2013.01); *B65D 90/14* (2013.01);
(Continued)

(58) Field of Classification Search
CPC .. B65D 88/027; B65D 88/32; B65D 90/0073; B65D 90/12; B65D 90/125; B65D 90/14;
(Continued)

(56) References Cited

U.S. PATENT DOCUMENTS

| 137,871 A | 4/1873 | Worsley |
|---|---|---|
| 150,894 A | 5/1874 | Safely |

(Continued)

FOREIGN PATENT DOCUMENTS

| CA | 2791088 A1 | 3/2013 |
|---|---|---|
| CN | 201390486 Y | 1/2010 |

(Continued)

OTHER PUBLICATIONS

Arrows Up, Inc., Jumbo BTS—Bulk Transport System, http://www.arrowsupinc.com/product-pages/AUI_8.5x11_Jumbo_Flyer_01-2014_Final.pdf; 2014.

(Continued)

*Primary Examiner* — James Keenan
(74) *Attorney, Agent, or Firm* — Andrus Intellectual Property Law, LLP

(57) ABSTRACT

A system for distributing a fracking proppant at a well site using a support frame to position a series of storage containers above a conveyor. The support frame receives a plurality of storage container and aligns the storage containers with hoppers formed on the conveyor. The support frame can include outriggers that extend to increase the stability and the amount of supported weight. The support frame includes a series of cross supports that extend across the conveyor belts to support the storage containers. The cross supports can include load cells to monitor the weight of the storage containers and stored proppant. The width of the cross supports can be adjusted and the support frame can include an extension frame to expand the width of the (Continued)

support frame. A control panel is included to display the status of the containers (full/empty/partially full) and control and monitoring the discharge rate of the plurality of containers.

18 Claims, 18 Drawing Sheets

(51) Int. Cl.
    *B65G 65/42*     (2006.01)
    *B65D 88/54*     (2006.01)
    *B65D 88/32*     (2006.01)
    *B65D 90/14*     (2006.01)

(52) U.S. Cl.
    CPC ............ *B65G 47/18* (2013.01); *B65G 65/42*
    (2013.01); *B65G 2201/045* (2013.01)

(58) Field of Classification Search
    CPC ...... B65D 90/20; B65G 41/006; B65G 47/18;
    B65G 65/40; B65G 65/42; B60P 1/38;
    B60P 1/56
    See application file for complete search history.

(56) References Cited

U.S. PATENT DOCUMENTS

| | | |
|---|---|---|
| 1,143,641 A | 6/1915 | McGregor |
| 1,486,206 A * | 3/1924 | Venable ................ B65D 88/32 52/194 |
| 1,609,407 A * | 12/1926 | Fry ........................ B65G 65/40 414/328 |
| 1,807,447 A | 5/1931 | Smith |
| 1,850,000 A | 3/1932 | Dauteuil |
| 1,932,320 A | 10/1933 | Stewart et al. |
| 2,293,160 A | 8/1942 | Miller et al. |
| 2,381,103 A | 8/1945 | Briner |
| 2,603,342 A | 7/1952 | Martinson |
| 2,616,758 A | 11/1952 | Meyers |
| 2,622,771 A | 12/1952 | Tulou |
| 2,652,174 A | 9/1953 | Shea et al. |
| 2,678,145 A | 5/1954 | Juzwiak et al. |
| 2,693,282 A | 11/1954 | Sensibar |
| 2,700,574 A | 1/1955 | Tourneau |
| 2,774,515 A | 12/1956 | Johansson et al. |
| 2,791,973 A | 5/1957 | Dorey |
| 2,801,125 A | 7/1957 | Page et al. |
| 2,808,164 A | 10/1957 | Glendinning |
| 2,812,970 A | 11/1957 | Martinson |
| 2,837,369 A | 6/1958 | Stopps |
| 2,865,521 A | 12/1958 | Fisher et al. |
| 2,894,666 A | 7/1959 | Campbell, Jr. |
| 2,925,930 A * | 2/1960 | Parks ..................... B65D 90/14 212/305 |
| 2,934,373 A * | 4/1960 | Doty, Jr. ................ B65D 90/14 410/80 |
| 3,083,879 A | 4/1963 | Coleman |
| 3,090,527 A | 5/1963 | Rensch |
| 3,109,389 A | 11/1963 | Karlsson |
| 3,122,258 A | 2/1964 | Shile |
| 3,135,407 A * | 6/1964 | Back ...................... B65D 90/14 254/45 |
| 3,135,432 A | 6/1964 | McKinney |
| 3,187,684 A | 6/1965 | Drtner |
| 3,248,026 A | 4/1966 | Kemp |
| 3,255,927 A | 6/1966 | Rupert, Jr. et al. |
| 3,265,443 A | 8/1966 | Simas |
| 3,270,921 A | 9/1966 | Nadolske et al. |
| 3,281,006 A | 10/1966 | Wei |
| 3,294,306 A | 12/1966 | Areddy |
| 3,318,473 A | 5/1967 | Jones et al. |
| 3,354,918 A | 11/1967 | Coleman |
| 3,377,030 A * | 4/1968 | Swenson .............. A01C 15/006 239/656 |
| 3,387,570 A | 6/1968 | Pulcrano et al. |
| 3,396,675 A | 8/1968 | Stevens |
| 3,397,654 A | 8/1968 | Snyder |
| 3,407,971 A | 10/1968 | Oehler |
| 3,425,599 A | 2/1969 | Sammarco et al. |
| 3,524,567 A | 8/1970 | Coleman |
| 3,596,609 A | 8/1971 | Ortner |
| 3,602,400 A | 8/1971 | Cooke |
| 3,650,567 A | 3/1972 | Danielson |
| 3,661,293 A | 5/1972 | Gerhard et al. |
| 3,692,363 A | 9/1972 | Tenebaum et al. |
| 3,704,797 A | 12/1972 | Suykens |
| 3,729,121 A | 4/1973 | Cannon |
| 3,734,215 A | 5/1973 | Smith |
| 3,738,511 A | 6/1973 | Lemon et al. |
| 3,777,909 A | 12/1973 | Rheinfrank, Jr. |
| 3,785,534 A | 1/1974 | Smith |
| 3,840,141 A | 10/1974 | Allom et al. |
| 3,854,612 A | 12/1974 | Snape |
| 3,883,005 A | 5/1975 | Stevens |
| 3,917,084 A | 11/1975 | Swisher, Jr. |
| 3,933,100 A | 1/1976 | Dugge |
| 3,970,123 A | 7/1976 | Poulton et al. |
| 3,986,708 A | 10/1976 | Heltzel et al. |
| 3,997,089 A | 12/1976 | Clarke et al. |
| 4,003,301 A | 1/1977 | Norton |
| 4,004,700 A | 1/1977 | Empey |
| 4,057,153 A | 11/1977 | Weaver |
| 4,058,239 A | 11/1977 | Van Mill |
| 4,059,195 A | 11/1977 | MacDonald et al. |
| 4,073,410 A | 2/1978 | Melcher |
| 4,138,163 A | 2/1979 | Calvert et al. |
| 4,227,732 A | 10/1980 | Kish |
| 4,247,228 A | 1/1981 | Gray et al. |
| 4,258,953 A | 3/1981 | Johnson |
| 4,278,190 A | 7/1981 | Oory et al. |
| 4,282,988 A | 8/1981 | Hulber, Jr. |
| 4,287,921 A | 9/1981 | Sanford |
| 4,287,997 A | 9/1981 | Rolfe et al. |
| 4,289,353 A | 9/1981 | Merritt |
| 4,329,106 A | 5/1982 | Adler |
| 4,397,406 A | 8/1983 | Croley |
| 4,398,653 A | 8/1983 | Daloisio |
| 4,405,089 A * | 9/1983 | Taylor ...................... B60P 1/38 239/656 |
| 4,428,504 A | 1/1984 | Bassett et al. |
| 4,449,861 A | 5/1984 | Saito |
| 4,453,645 A | 6/1984 | Usui et al. |
| 4,475,672 A | 10/1984 | Whitehead |
| 4,483,462 A | 11/1984 | Heintz |
| 4,569,394 A | 2/1986 | Sweatman et al. |
| 4,571,143 A | 2/1986 | Hellerich |
| 4,608,931 A | 9/1986 | Ruhmann et al. |
| 4,626,155 A | 12/1986 | Hlinsky et al. |
| 4,628,825 A | 12/1986 | Taylor et al. |
| 4,660,733 A | 4/1987 | Snyder et al. |
| 4,785,966 A | 11/1988 | Waltke |
| 4,795,301 A | 1/1989 | Snead et al. |
| 4,819,830 A | 4/1989 | Schultz |
| 4,848,605 A | 7/1989 | Wise |
| 4,909,556 A | 3/1990 | Koskinen |
| 4,919,583 A | 4/1990 | Speakman, Jr. |
| 4,946,068 A | 8/1990 | Erickson et al. |
| 4,975,205 A | 12/1990 | Sloan |
| 4,995,522 A | 2/1991 | Barr |
| 5,080,259 A | 1/1992 | Hadley |
| 5,105,858 A | 4/1992 | Levinson |
| 5,190,182 A | 3/1993 | Copas et al. |
| 5,199,826 A | 4/1993 | Lawrence |
| 5,224,635 A | 7/1993 | Wise |
| 5,290,139 A | 3/1994 | Hedrick |
| 5,324,097 A | 6/1994 | Decap |
| 5,373,792 A | 12/1994 | Pileggi et al. |
| 5,402,915 A | 4/1995 | Hogan |
| 5,441,321 A | 8/1995 | Karpisek |
| 5,493,852 A | 2/1996 | Stewart |
| 5,538,286 A | 7/1996 | Hoff |
| 5,549,278 A | 8/1996 | Sidler |
| 5,564,599 A | 10/1996 | Barber et al. |

(56) References Cited

U.S. PATENT DOCUMENTS

| | | |
|---|---|---|
| 5,613,446 A | 3/1997 | DiLuigi et al. |
| 5,617,974 A | 4/1997 | Sawyer, Jr. |
| 5,647,514 A | 7/1997 | Toth et al. |
| 5,687,881 A | 11/1997 | Rouse et al. |
| 5,690,466 A | 11/1997 | Gaddis et al. |
| 5,697,535 A | 12/1997 | Coleman |
| 5,722,552 A | 3/1998 | Olson |
| 5,780,779 A | 7/1998 | Kitamura et al. |
| 5,782,524 A | 7/1998 | Heider et al. |
| 5,803,296 A | 9/1998 | Olson |
| 5,836,480 A | 11/1998 | Epp et al. |
| 5,842,619 A | 12/1998 | Cousino |
| 5,845,799 A | 12/1998 | Deaton |
| 5,911,337 A | 6/1999 | Bedeker |
| 5,927,558 A | 7/1999 | Bruce |
| 5,971,219 A | 10/1999 | Karpisek |
| 6,006,918 A | 12/1999 | Hart |
| 6,109,486 A | 8/2000 | Lee, Jr. et al. |
| 6,120,233 A | 9/2000 | Adam |
| 6,155,175 A | 12/2000 | Rude et al. |
| 6,190,107 B1 | 2/2001 | Lanigan, Sr. et al. |
| 6,196,590 B1 | 3/2001 | Kim |
| 6,205,938 B1 | 3/2001 | Foley et al. |
| 6,247,594 B1 | 6/2001 | Garton |
| 6,263,803 B1 | 7/2001 | Dohr et al. |
| 6,269,849 B1 | 8/2001 | Fields, Jr. |
| 6,328,183 B1 | 12/2001 | Coleman |
| 6,382,446 B1 | 5/2002 | Hinkle et al. |
| 6,401,983 B1 | 6/2002 | McDonald et al. |
| 6,412,422 B2 | 7/2002 | Dohr et al. |
| 6,415,909 B1 | 7/2002 | Mitchell et al. |
| 6,416,271 B1 | 7/2002 | Pigott et al. |
| 6,457,291 B2 | 10/2002 | Wick |
| 6,505,760 B1 | 1/2003 | Werner |
| 6,508,387 B1 | 1/2003 | Simon et al. |
| 6,523,482 B2 | 2/2003 | Wingate |
| 6,527,134 B2 | 3/2003 | Hinkle |
| 6,533,122 B1 | 3/2003 | Plunkett |
| 6,537,002 B2 | 3/2003 | Gloystein |
| 6,537,015 B2 * | 3/2003 | Lim .................. B65D 90/14 410/80 |
| 6,666,573 B2 | 12/2003 | Grassi |
| 6,772,912 B1 | 8/2004 | Schall et al. |
| 6,774,318 B2 | 8/2004 | Beal et al. |
| 6,783,032 B2 | 8/2004 | Fons |
| 6,902,061 B1 | 6/2005 | Elstone |
| 6,953,119 B1 | 10/2005 | Wening |
| 6,968,946 B2 | 11/2005 | Shuert |
| 7,008,163 B2 | 3/2006 | Russell |
| 7,051,661 B2 | 5/2006 | Herzog et al. |
| 7,104,425 B2 | 9/2006 | Le Roy |
| 7,140,516 B2 | 11/2006 | Bother et al. |
| 7,146,914 B2 | 12/2006 | Morton et al. |
| 7,214,028 B2 | 5/2007 | Boasso et al. |
| 7,240,681 B2 | 7/2007 | Saik |
| 7,252,309 B2 | 8/2007 | Eng Soon et al. |
| 7,284,579 B2 | 10/2007 | Elgan et al. |
| 7,316,333 B2 | 1/2008 | Wegner |
| 7,367,271 B2 | 5/2008 | Early |
| 7,377,219 B2 | 5/2008 | Brandt |
| 7,475,796 B2 | 1/2009 | Garton |
| 7,500,817 B2 | 3/2009 | Furrer et al. |
| 7,513,280 B2 | 4/2009 | Brashears et al. |
| 7,591,386 B2 | 9/2009 | Hooper |
| 7,640,075 B2 | 12/2009 | Wietgrefe |
| 7,837,427 B2 | 11/2010 | Beckel et al. |
| 7,891,304 B2 | 2/2011 | Herzog et al. |
| 7,921,783 B2 | 4/2011 | Forbes et al. |
| 7,967,161 B2 | 6/2011 | Townsend |
| 7,980,803 B2 | 7/2011 | Brandstatter et al. |
| 7,997,623 B2 | 8/2011 | Williams |
| 8,083,083 B1 | 12/2011 | Mohns |
| 8,182,046 B1 | 5/2012 | Hauth |
| 8,201,520 B2 | 6/2012 | Meritt |
| 8,379,927 B2 | 2/2013 | Taylor |
| 8,387,824 B2 | 3/2013 | Wietgrefe |
| 8,393,502 B2 | 3/2013 | Renyer et al. |
| D688,349 S | 8/2013 | Oren et al. |
| D688,350 S | 8/2013 | Oren et al. |
| D688,351 S | 8/2013 | Oren et al. |
| 8,505,780 B2 | 8/2013 | Oren |
| 8,545,148 B2 | 10/2013 | Wanek-Pusset et al. |
| 8,585,341 B1 | 11/2013 | Oren et al. |
| 8,616,370 B2 | 12/2013 | Allegretti et al. |
| 8,622,251 B2 | 1/2014 | Oren |
| 8,663,371 B1 | 3/2014 | Wann |
| 8,668,430 B2 | 3/2014 | Oren et al. |
| 8,827,118 B2 | 9/2014 | Oren |
| 8,887,914 B2 | 11/2014 | Allegretti et al. |
| 8,915,691 B2 | 12/2014 | Mintz |
| 9,052,034 B1 | 6/2015 | Wegner et al. |
| 9,248,772 B2 | 2/2016 | Oren |
| 9,296,518 B2 | 3/2016 | Oren |
| 9,403,626 B2 | 8/2016 | Oren |
| 9,440,805 B2 * | 9/2016 | Carlson ................ B65G 65/40 |
| 9,511,929 B2 | 12/2016 | Oren |
| 9,624,030 B2 * | 4/2017 | Oren .................... B65D 88/30 |
| 9,670,752 B2 * | 6/2017 | Glynn .................. B65G 65/42 |
| 9,718,610 B2 * | 8/2017 | Oren .................... B65D 88/30 |
| 9,758,082 B2 | 9/2017 | Eiden, III et al. |
| 10,150,612 B2 * | 12/2018 | Pham .................. B65D 88/32 |
| 10,167,146 B2 * | 1/2019 | Johnston .............. B65D 88/127 |
| 2001/0022308 A1 | 9/2001 | Epp et al. |
| 2003/0111470 A1 | 6/2003 | Fouillet et al. |
| 2004/0065699 A1 | 4/2004 | Schoer et al. |
| 2004/0084874 A1 | 5/2004 | McDougall et al. |
| 2006/0012183 A1 | 1/2006 | Marchiori et al. |
| 2006/0151058 A1 | 7/2006 | Salaoras et al. |
| 2006/0180062 A1 | 8/2006 | Furrer et al. |
| 2006/0180232 A1 | 8/2006 | Glewwe et al. |
| 2006/0267377 A1 | 11/2006 | Lusk et al. |
| 2008/0008562 A1 | 1/2008 | Beckel et al. |
| 2008/0022739 A1 | 1/2008 | Aswani |
| 2008/0029546 A1 | 2/2008 | Schuld |
| 2008/0029553 A1 | 2/2008 | Culleton |
| 2008/0179054 A1 | 7/2008 | McGough et al. |
| 2008/0179324 A1 | 7/2008 | McGough et al. |
| 2008/0226434 A1 | 9/2008 | Smith et al. |
| 2008/0277423 A1 | 11/2008 | Garton |
| 2009/0038242 A1 | 2/2009 | Cope |
| 2009/0078410 A1 | 3/2009 | Krenek et al. |
| 2010/0040446 A1 | 2/2010 | Renyer |
| 2010/0193077 A1 | 8/2010 | Nelson et al. |
| 2010/0278621 A1 | 11/2010 | Redekop |
| 2011/0011893 A1 | 1/2011 | Cerny |
| 2011/0101040 A1 | 5/2011 | Weissbrod |
| 2011/0160104 A1 | 6/2011 | Wu et al. |
| 2011/0168593 A1 | 7/2011 | Neufeld et al. |
| 2011/0297702 A1 | 12/2011 | Hildebrandt et al. |
| 2012/0009046 A1 | 1/2012 | Mauchle et al. |
| 2012/0099954 A1 | 4/2012 | Teichrob et al. |
| 2012/0103848 A1 | 5/2012 | Allegretti et al. |
| 2012/0219391 A1 | 8/2012 | Teichrob et al. |
| 2013/0004272 A1 | 1/2013 | Mintz |
| 2013/0022441 A1 | 1/2013 | Uhryn et al. |
| 2013/0161211 A1 | 6/2013 | Oren |
| 2013/0206415 A1 | 8/2013 | Sheesley |
| 2013/0209204 A1 | 8/2013 | Sheesley |
| 2014/0020765 A1 | 1/2014 | Oren |
| 2014/0023463 A1 | 1/2014 | Oren |
| 2014/0023464 A1 | 1/2014 | Oren et al. |
| 2014/0023465 A1 | 1/2014 | Oren et al. |
| 2014/0083554 A1 | 3/2014 | Harris |
| 2014/0166647 A1 | 6/2014 | Sheesley et al. |
| 2014/0305769 A1 | 10/2014 | Eiden, III et al. |
| 2016/0031658 A1 | 2/2016 | Oren et al. |
| 2016/0280480 A1 | 9/2016 | Smith et al. |
| 2017/0274813 A1 | 9/2017 | Eiden, III et al. |

FOREIGN PATENT DOCUMENTS

| | | |
|---|---|---|
| DE | 4217329 A1 | 5/1993 |
| EP | 0564969 A1 | 10/1993 |
| EP | 1052194 A1 | 11/2000 |

(56) References Cited

FOREIGN PATENT DOCUMENTS

| | | | |
|---|---|---|---|
| EP | 1340862 A1 * | 9/2003 | ........... B65D 88/121 |
| EP | 2311757 A1 | 4/2011 | |
| GB | 1412720 | 11/1975 | |
| JP | 10264882 A | 10/1998 | |
| MX | 2012011046 A | 5/2013 | |
| WO | 1993001997 | 4/1993 | |
| WO | 2007061310 A1 | 5/2007 | |
| WO | 2010022308 A1 | 2/2010 | |
| WO | 2013/095871 A1 | 6/2013 | |
| WO | 2013/142421 A1 | 9/2013 | |
| WO | 2014/018129 A1 | 1/2014 | |
| WO | 2014/018236 | 1/2014 | |

OTHER PUBLICATIONS

Monster Tanks Inc., Sand Monster Website, http://monstertanksinc.com/sand-monster.html; 2012.
Reusable Packaging Association, Member Spotlight : John Allegretti, President & CEO, Arrows Up, Inc., http://reusables.org/2787/general/member-spotlight-john-allegretti-president-ceo-arrows-up-inc; 2013.
SeedQuest, Arrows Up, Inc. launches innovative bulk transport system for seed, http://www.arrowsupinc.com/news/SeedQuest_03-03-11.pdf; 2011.
Seed Today, Arrows Up, Inc. Bulk Transport System (BTS), http://www.arrowsupinc.com/news/SeedToday_03-03-11.pdf; 2011.
Solaris Oilfield Infrastructure, Mobile Sand Silo System Website, http://www.solarisoilfield.com/solaris-solutions/mobile-sand-silo-system; 2016.

* cited by examiner

BOX SUPPORT FRAME FOR USE WITH T-BELT CONVEYOR

CROSS REFERENCE TO RELATED APPLICATION

The present application is based on and claims priority to U.S. Provisional Patent Application Ser. No. 62/384,234, filed on Sep. 7, 2016, the disclosure of which is incorporated herein by reference.

FIELD OF THE DISCLOSURE

The present disclosure generally relates to a support frame for supporting one or more intermodal containers above a T-belt conveyor for transporting, storing and distributing a frac proppant, such as sand, from a product source to a well site. The intermodal containers and base unit allow a relatively large volume of frac proppant to be stored at a transport terminal or well site and subsequently distributed for use in hydraulic fracturing (herein abbreviated "fracking").

BACKGROUND

At a fracking well site, a granular-containing fluid is pumped through a well bore and to targeted regions to create "fractures" within the underlying hydrocarbon formations. The granular material used in the mining fluid is referred to as a proppant. In many cases, the proppant is a specialized type of sand (natural, man-made or modified), referred to generally as frac sand.

Frac sand must be transported to the well site, which is often a significant distance away from the source of the fracking sand. Presently, the frac sand is trucked to the well site and discharged from the storage truck into a relatively small storage area at the well site. Since large volumes of sand and water must be continuously provided to the well site by trucks, traffic issues arise, which can interrupt the supply of either the water or frac sand. If the supply of either the water or frac sand is disturbed, such a disruption can result in the inefficient use of the well drilling equipment. If well drilling equipment is shut down because of the lack of supply of either sand or water, the cost to the well drilling company can be significant.

Presently, T-belt conveyors are located at the well site to transport the fracking sand from a storage truck to a blending location. The T-belt conveyors already exist at the well site and continued use of the T-belt conveyor is desired. In addition to the existing T-belt conveyors already in use at a well site, there is normally a trailer mounted series of storage bins mounted onto a conveyor belt which discharges onto the T-belts.

SUMMARY

The present disclosure relates to a system and method to provide complete proppant storage, transloading and well pad delivery within unitized intermodal containers. The system and method utilizes an intermodal container that receives a granular material, such as frac sand, from an excavation site. Once the intermodal containers are loaded with frac sand, the containers may be transported to a transloading terminal using ships, rail cars or trailer trucks, or a combination of the three. When the intermodal containers are received at the well site loaded with frac sand, the containers are stacked in a storage location on or near the well site. This allows the well site operator to store sand in the same intermodal containers that were used to transport the sand to the well site.

As needed, the intermodal containers are positioned on a support frame and the contents of the intermodal container are emptied onto one or more T-belt conveyors each having one or more separate conveyor belts. Each of the intermodal containers is designed such that the container can empty the entire contents of the container onto the T-belt conveyor within approximately one to five minutes. The support frame may include one or more load cells that allow for the automated monitoring of the weight of the container and sand to determine when the container is emptied of the contents. The support frame can be installed over the T-belt conveyors or over one or more of the commonly provided trailer mounted storage bins at the wellsite.

Once the container has been emptied of its contents, the container is removed from the support frame and either returned to the storage location or placed on a transportation device, such as a trailer truck, for removal from the well site. The intermodal containers will typically be returned to the proppant source for refilling and retransportation back to the well site. The proppant source could be a mine or other locations that include a supply of the proppant, such as a terminal silo, sea port or other storage location.

The support frame that supports multiple containers allows the containers to be emptied onto a T-belt conveyor or into trailer mounted storage bins that discharge onto T-belt conveyors such that the T-belt conveyor can then distribute the frac sand to a blending location. The support frame remains in a fixed position relative to the T-belt conveyor or trailer mounted storage bins and the series of intermodal containers are placed on the support frame to deliver the frac sand as desired.

In one embodiment of the disclosure, the support frame includes a plurality of cross supports that are each supported on the ground by a support leg. The cross supports each extend past the sides of the conveyor such that the conveyor is located between the support legs. The cross supports are connected by side beams to provide structural support for the weight of the storage containers and the included proppant.

In one embodiment, the cross supports each include a first end and a second end. Each of the first and second ends includes an outrigger that can extend the width of the support frame. The outriggers each include a movable beam portion that extends from or is retracted into a center beam portion. When extended, the movable beam increase the width and support for the support frame.

In another embodiment, the length of each of the cross supports is adjustable by moving a first section into or out of a second section. In this manner, the width of the support frame can be modified depending on the conveyor. Additionally, the support frame can be narrowed for storage and transport.

In yet another embodiment of the support frame, the support frame includes a pair of separate bridge sections that each extend along across the longitudinal length of the T-belt conveyor. Each of the bridge sections are positioned adjacent to each other and include a series of cross supports joined to each other by side beams.

In yet another embodiment, the support frame includes a plurality of support tables that each extend across the longitudinal length of the conveyor. Each of the support tables is a self-supporting member having a plurality of support legs. The support tables each support a pair of the storage containers in a side-by-side orientation where each storage container is aligned with one of the hoppers formed as part of the conveyor.

As can be understood by the above description, the same intermodal container is used to receive sand at the sand mine, transport the sand to the well site either on a rail car, ship or truck, store the sand at the well site until the contents of the container are needed and finally discharge the sand onto a conveying system. The use of a single container for initial loading, transportation, storage and discharge reduces the amount of time and transportation cost needed to deliver frac sand to a well site.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
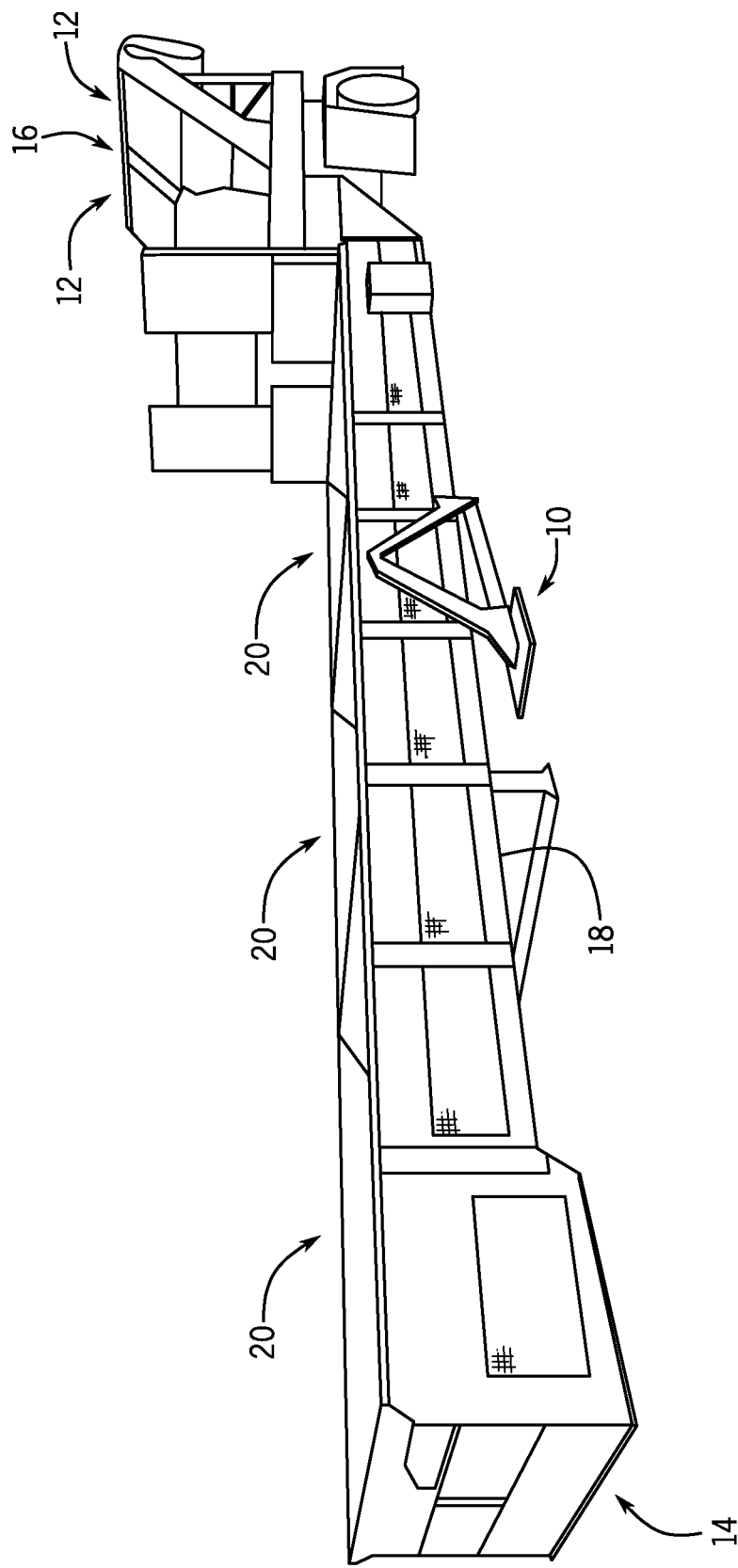
FIG. 1 is a perspective view showing a conventional T-belt conveyor.

FIG. 1 illustrates an existing piece of equipment that is used on a large number of fracking well sites to convey a proppant, such as frac sand, to a mixing location. The existing piece of equipment is referred to as a T-belt conveyor 10. The T-belt conveyor 10 includes a pair of moving conveyor belts 12 that extend from a first end 14 to a second end 16 of a trailer 18. The trailer 18 includes multiple loading bays that each include a pair of loading hoppers 20 that each includes a sloping inner wall to direct the proppant material onto one of the conveyor belts 12 to allow the proppant material to be discharged by the pair of moving conveyor belts 12. Thus, the three-bay conveyor 10 includes six hoppers that can be separately loaded as will be discussed below.

Typically, the trailer 18 does not move from a position at the fracking well site once in positon. Although the T-belt conveyor 10 shown in the drawing figures includes two conveyor belts 12, other T-belt conveyors exist that include only a single moving conveyor belt. In a single belt conveyor, the conveyor includes multiple loading hoppers that direct material onto the single moving conveyor belt. The support frame system and method of the present disclosure can be modified to be used with a T-belt conveyor that includes only a single moving conveyor belt.

Figure 2:
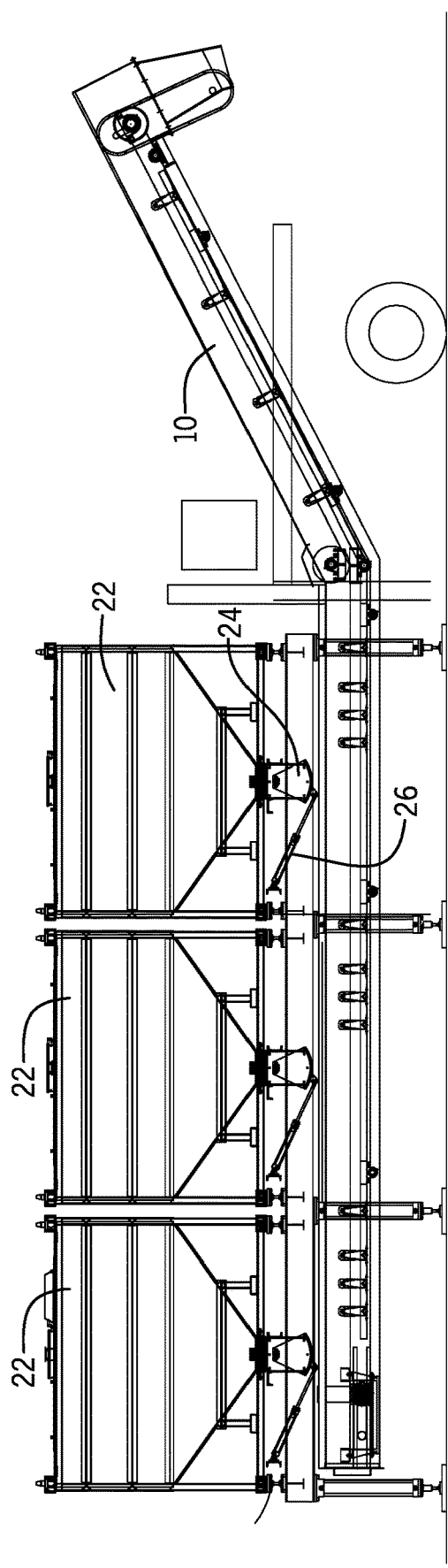
FIG. 2 is a side view of a first embodiment of a support frame positioned above the T-belt conveyor.

FIGS. 2-6 illustrate a first embodiment of a system for positioning a series of six intermodal storage containers 22 oriented in two rows of three containers each above the T-belt conveyor 10. Each of the storage containers 22 stores a supply of material to be dispensed, such as fracking sand. As shown in FIG. 2, each of the storage containers 22 includes a box gate that feeds material to a controlled clam shell, slide gate, ladder gate or other similar discharge gate 24 that can be selectively opened and closed by a hydraulic cylinder 26. In the present embodiment, the box gate is manually controlled and opened to feed material to the clam shell discharge gate 24. Issued U.S. Pat. No. 9,758,082 discloses the configuration of an example of a storage container 22 and is incorporated herein by reference. The system of the present disclosure could be used with other storage containers as well.

Figure 5:
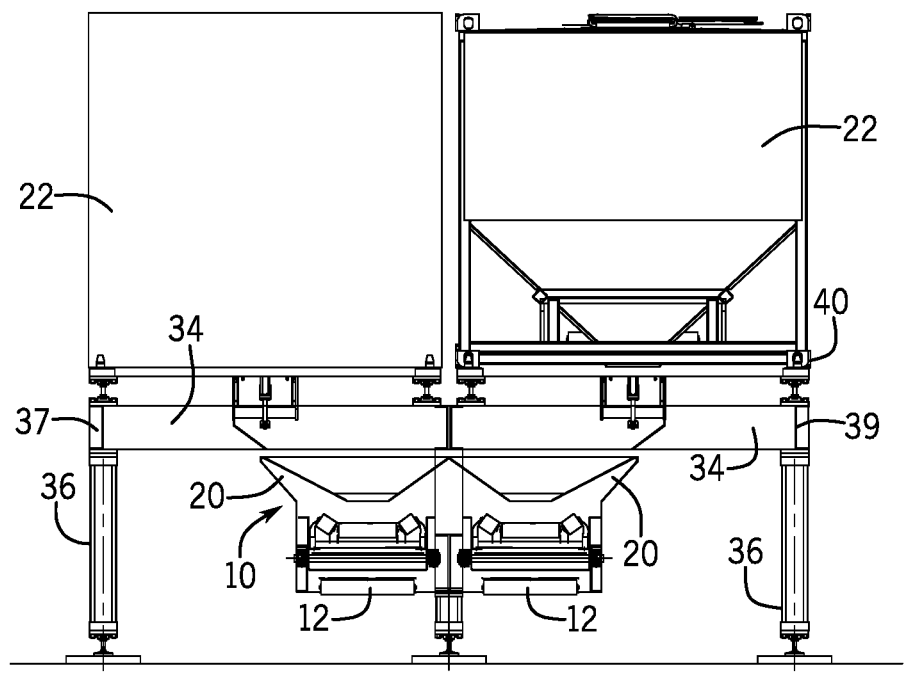
FIG. 5 is a end view showing the position of the support frame over the T-belt conveyor and a support of a pair of storage containers.

In the embodiment shown in FIG. 2, a first row of three individual storage containers 22 are positioned above each of the loading hoppers 20, referred to in the drawing figure as Bay One, Bay Two and Bay Three, of the T-belt conveyor. A second row of storage containers 22 are aligned with the first row (see FIG. 5) such that a storage container is aligned with each hopper for each of the two spaced conveyer belts. Thus, as shown in FIG. 5, two rows of storage containers 22 can be positioned adjacent to each other to discharge the stored material onto the conveyor belts 12 of the T-belt conveyor 10. Each of the storage containers 22 discharges material from a discharge gate 24 into the respective hopper 20 of the T-belt conveyor 10.

Figure 3:
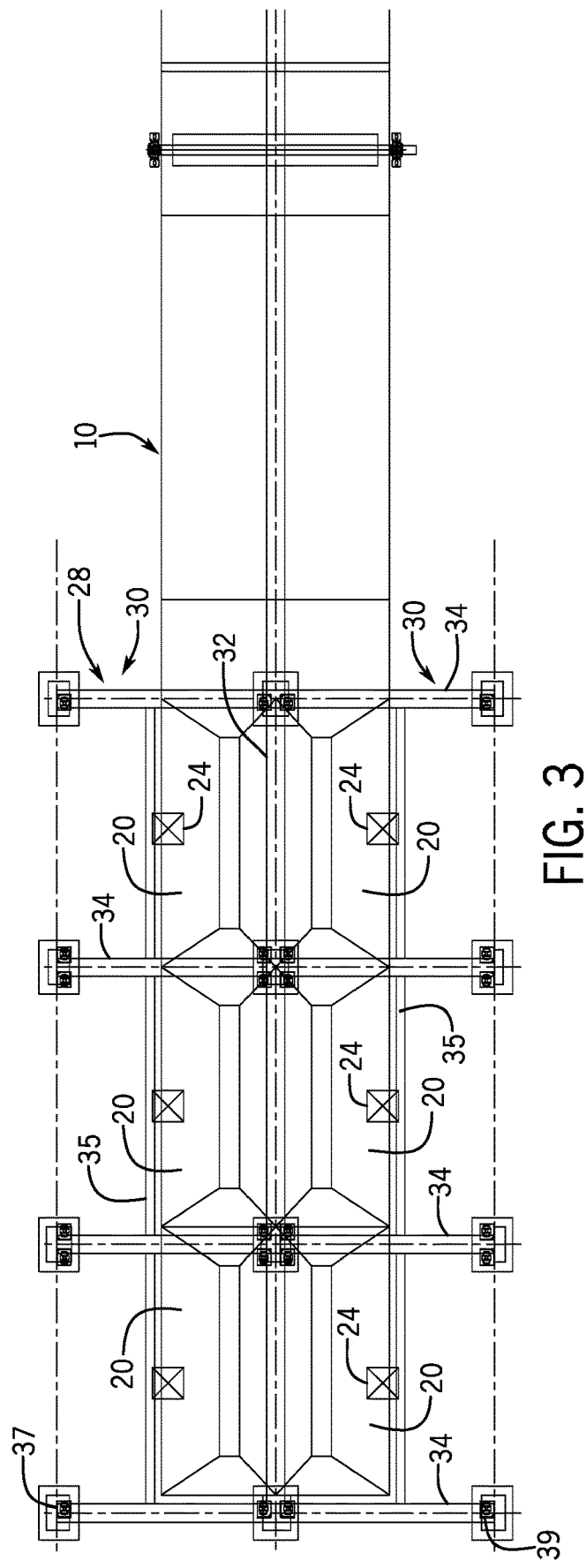
FIG. 3 is a top view of the first embodiment of the support frame.
Figure 4:
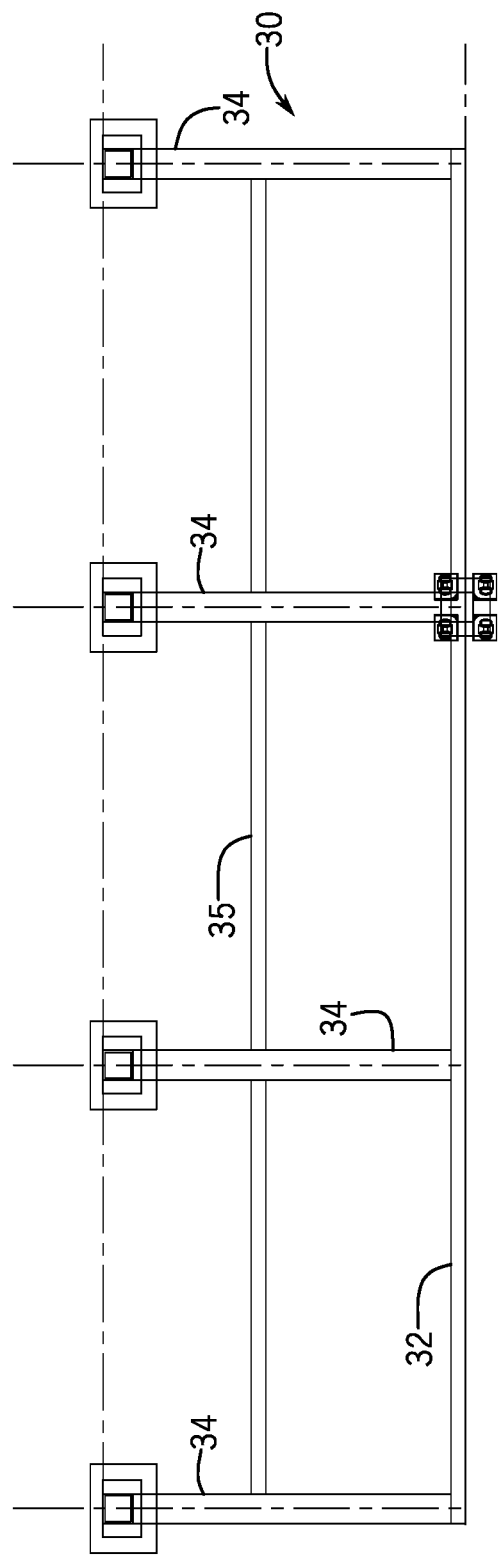
FIG. 4 is a top view of one portion of the support frame.
Figure 6:
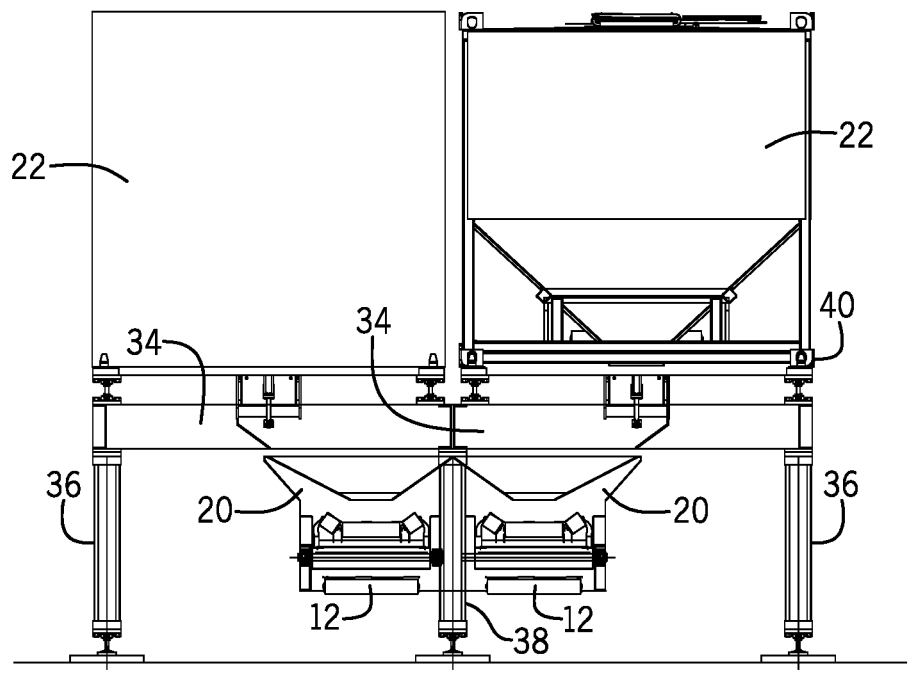
FIG. 6 is a view similar to FIG. 5.

Referring back to FIG. 3, the first embodiment includes a support frame 28 that is positioned over the trailer of the T-belt conveyor 10 to support the six individual storage containers. The support frame 28 in the embodiments shown in FIG. 3 is formed from two separate bridge sections 30 that come together along a center beam 32. FIG. 4 shows one of two bridge sections 30. Each of the bridge sections 30 includes a plurality of cross supports 34 that are joined by a side beam 35. As shown in FIGS. 5 and 6, each of the horizontal cross supports 34 extends past the side edge of the conveyor 10 and includes an outer support leg 36 to support the horizontal cross support on the ground. As illustrated in FIG. 6, a center support leg 38 provides support along the center joint between the two bridge sections 30 of the support frame 28. The cross supports 34 of the pair of bridge sections 30 combine to define a first end 37 and a second end 39 that are each spaced from the sides of the conveyor 10.

In the embodiments shown in FIGS. 5 and 6, each of the storage containers 22 is supported at its four corners by a separate load cell 40. The load cells 40 each generate an electronic signal related to the amount of load sensed by the load cell 40. The four load cells 40 located at the corners of the storage container allow for the automated monitoring of the weight of the material contained within the storage container 22 both before discharge and as the material is discharged through the gate and onto the conveyer belt 12. Once the automated sensing system determines that the container 22 is empty, the container is removed and replaced with a full container. Additional box empty/full status indicators could be employed in the belt hopper either in addition to the load cells 40 or without the load cells. Such status indicators could include a photocell, acoustic transmission/reflection sensors, a rotating impeller within the hopper that rotates and which rotation is halted by the presence of proppant in the hopper or other methods of determining if the storage container contains proppant material.

Figure 7:
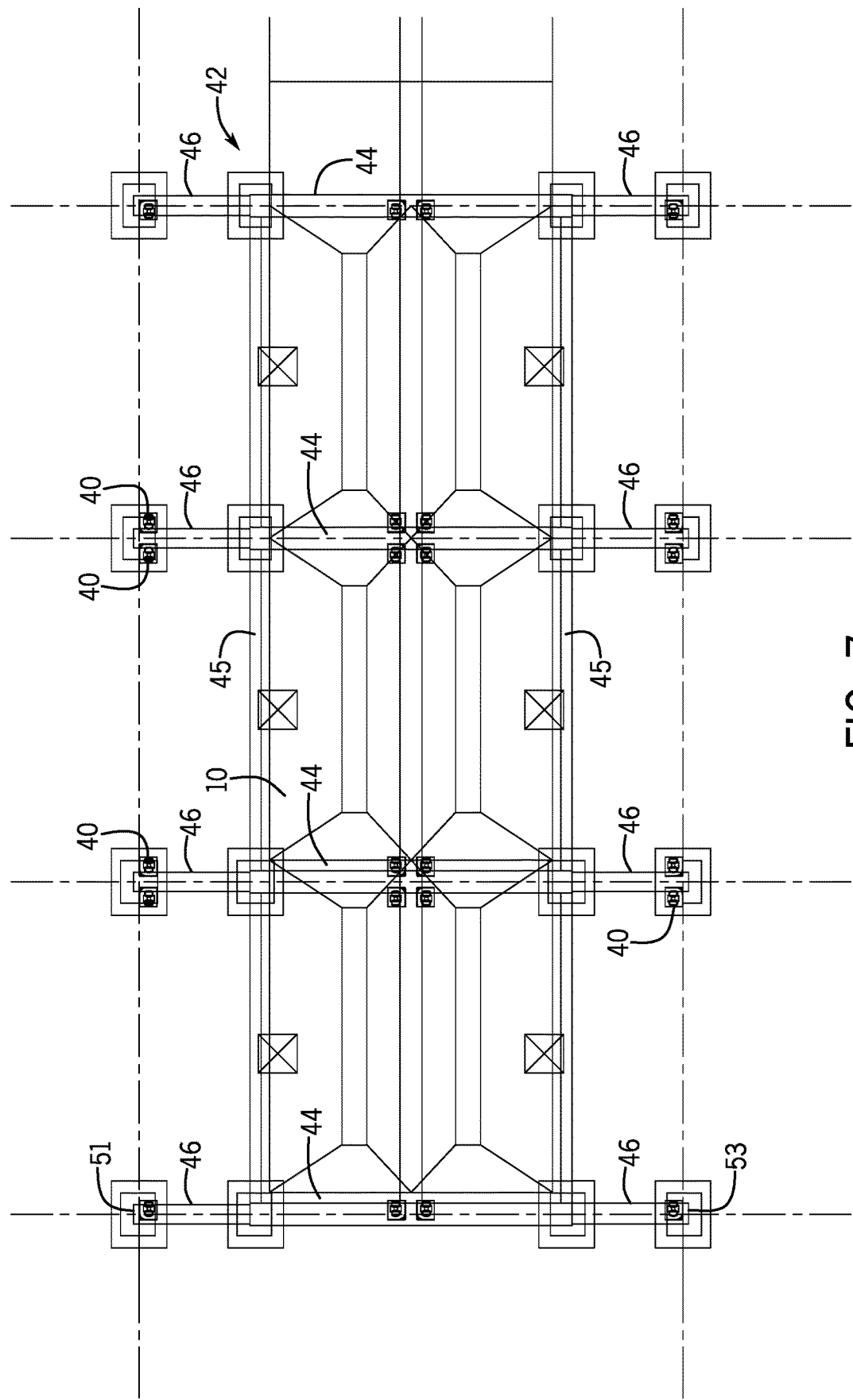
FIG. 7 is a top plan view of a second embodiment of a support frame in accordance with the present disclosure.
Figure 8:
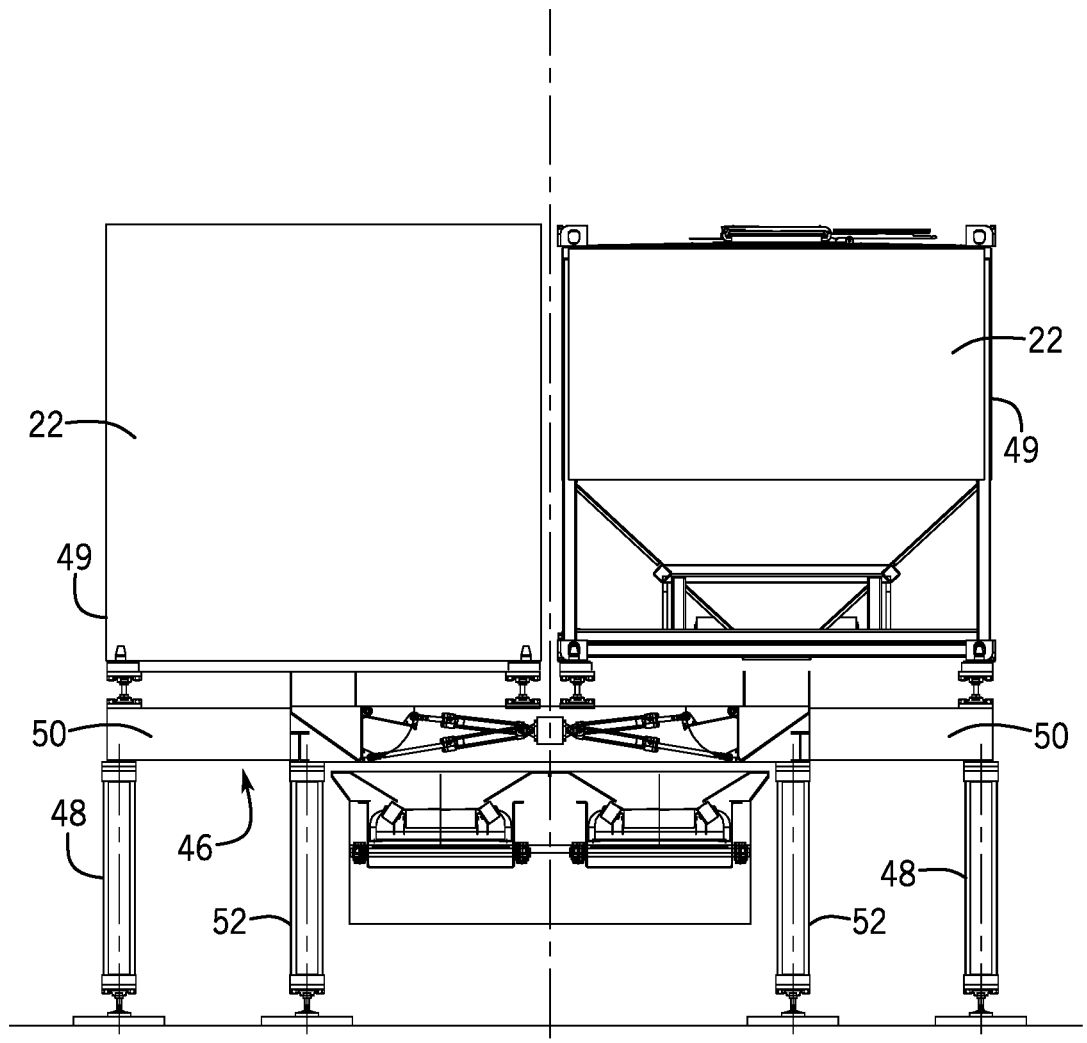
FIG. 8 is an end view of the second embodiment of the support frame.

FIGS. 7 and 8 illustrate a second embodiment of the storage container mounting system of the present disclosure. In the second embodiment, as shown in FIG. 7, a support frame 42 again spans over the width of the T-belt conveyor 10. However, in the embodiment shown in FIGS. 7 and 8, the support frame 42 includes a series of spaced cross supports 44 joined by the pair of spaced side beams 45. Each of the cross supports 44 includes an outrigger 46 located at each of its spaced first and second outer ends 51 and 53 respectively. The outriggers 46, as shown in FIG. 8, include an outer support leg 48 and a moveable beam 50. The moveable beam 50 can be extended to support the entire weight of the storage container 22 when the storage container 22 is supported as shown in FIG. 8.

Each of the moveable beams 50 can be extended such that the overall length of the cross support 44, including the moveable beams 50, can extend to the outer edge 49 of the storage container 22 as illustrated in FIG. 8. The outrigger moveable beam 50 will include one of the load cells as described above. As can be understood in FIGS. 7 and 8, the support frame 42 will include one more cross support 44 than the number of storage containers 22 that can be supported by the support frame 42. The series of cross supports 44 are supported on each of their ends by legs 52. In this manner, the support frame 42 is able to support six of the storage containers 22 in proper alignment to discharge material onto the T-belt conveyor 10.

Figure 9:
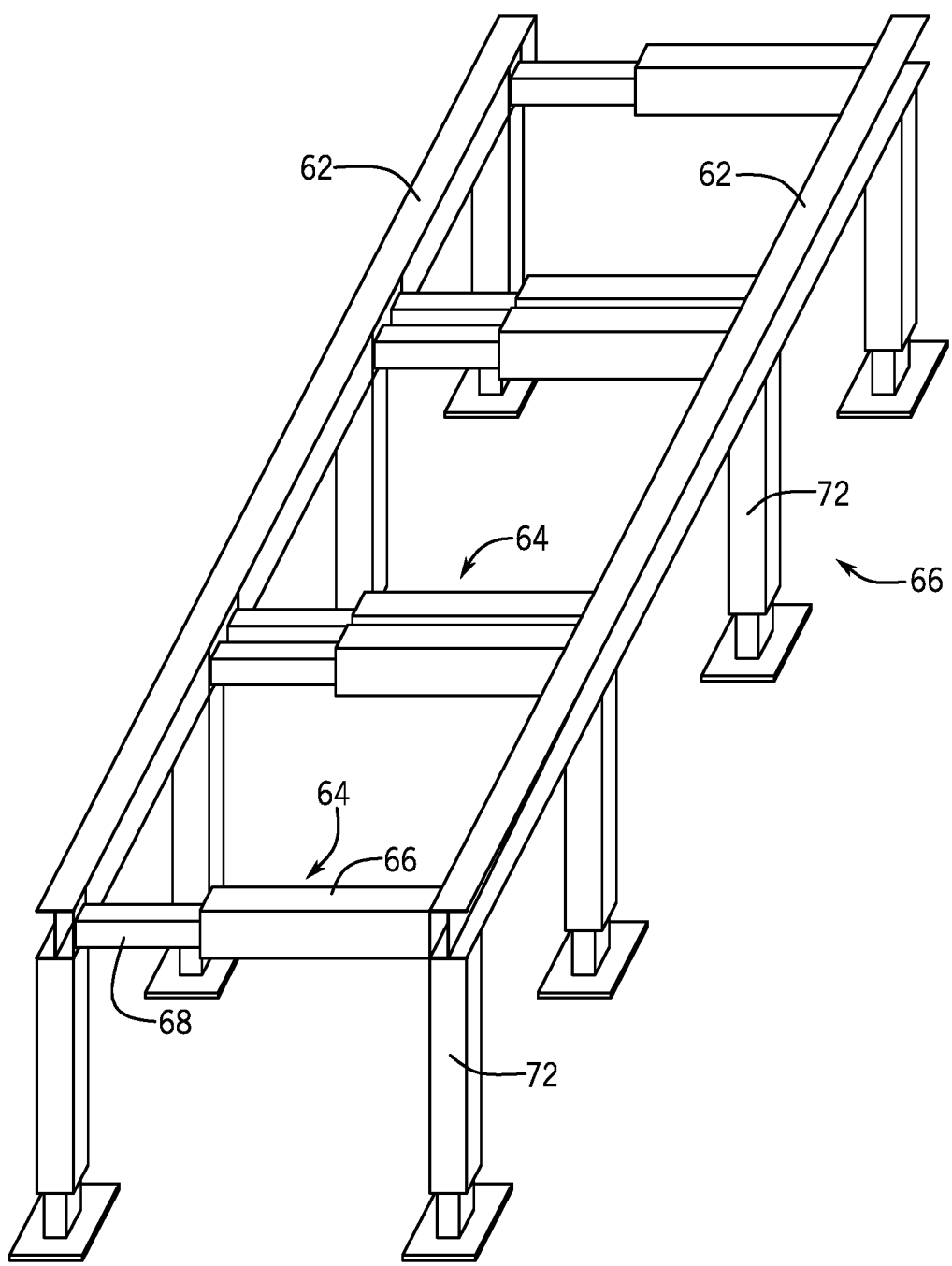
FIG. 9 is a perspective view of a third embodiment of a support frame.
Figure 10:
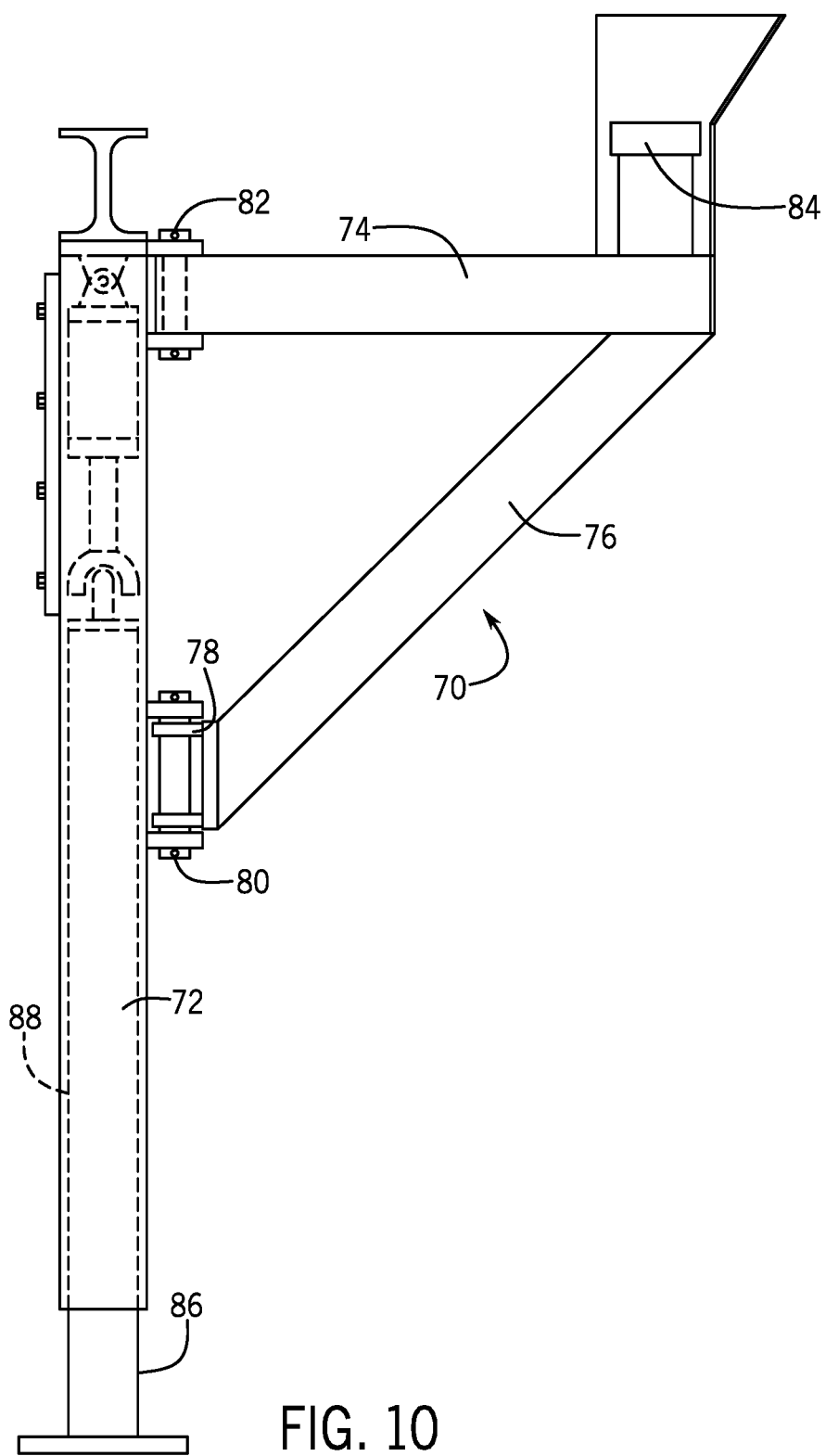
FIG. 10 is a partial side view of the third embodiment of the support frame.

FIGS. 9-10 illustrate a third embodiment of a support frame 60. The support frame 60 again spans over the width of the T-belt conveyor (not shown) and can support six of the intermodal storage containers. The support frame 60 shown in FIG. 9 includes a pair of side rails 62 that can be moved toward and away from each other through a series of expanding length cross supports 64. Each of the cross supports 64 includes an outer section 66 and an inner section 68. The inner section 68 can be extended into and out of the outer section 66 through an extension cylinder (not shown). The movement of the inner section 68 relative to the outer section 66 allows the width of the support frame 60 to be adjusted. The extension and retraction of the width of the support frame 60 allows the support frame 60 to be stored and transported in a retracted position and expanded to a size dictated by the T-belt conveyor.

FIG. 10 illustrates an outer extension frame 70 that is mounted to each of the vertical support legs 72. The extension frame 70 includes a horizontal support beam 74 as well as an angled support arm 76. The support arm 76 is mounted at its inner end about a pivot bracket 78 that receives a pivot pin 80. The horizontal support beam 74 also pivots about a pivot pin 82. In this manner, the entire extension frame 70 can rotate from the extended position shown in FIG. 10 to a retracted position.

When the extension frame 70 is in the extended position shown in FIG. 10, the horizontal support beam 74 can support the outer corner of a storage container. A load cell pad 84 is shown in FIG. 10 that supports one corner of one of the storage containers. As illustrated in FIG. 10, the support leg 72 includes an extendable portion 86 that is connected to an internal cylinder 88 to adjust the length of the support leg 72.

Figure 11:
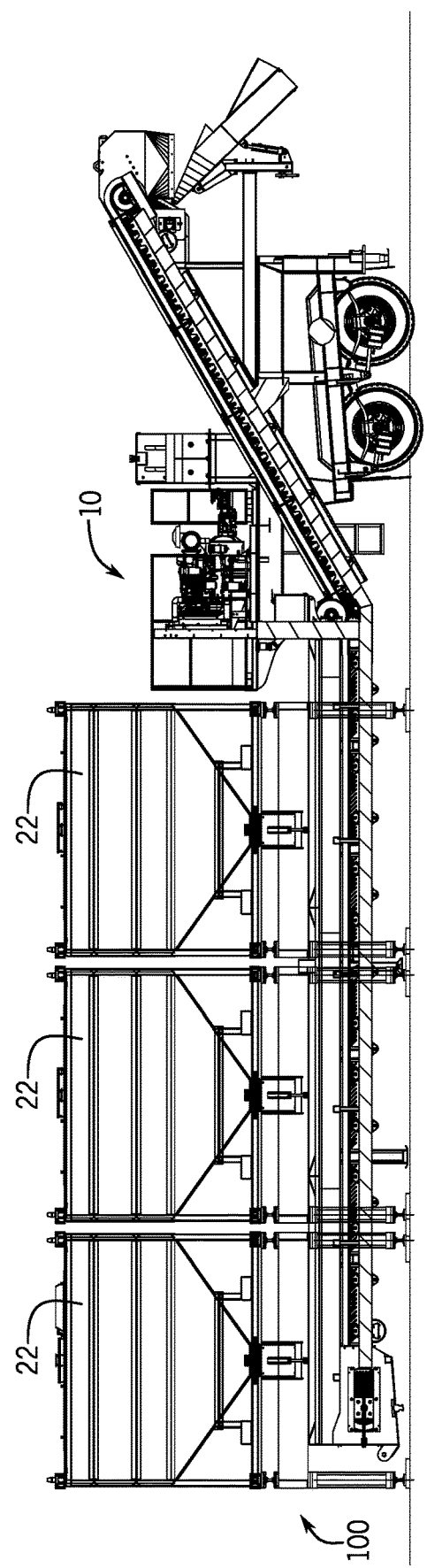
FIG. 11 is a side view of a fourth embodiment of a support frame positioned above the T-belt conveyor.
Figure 12:
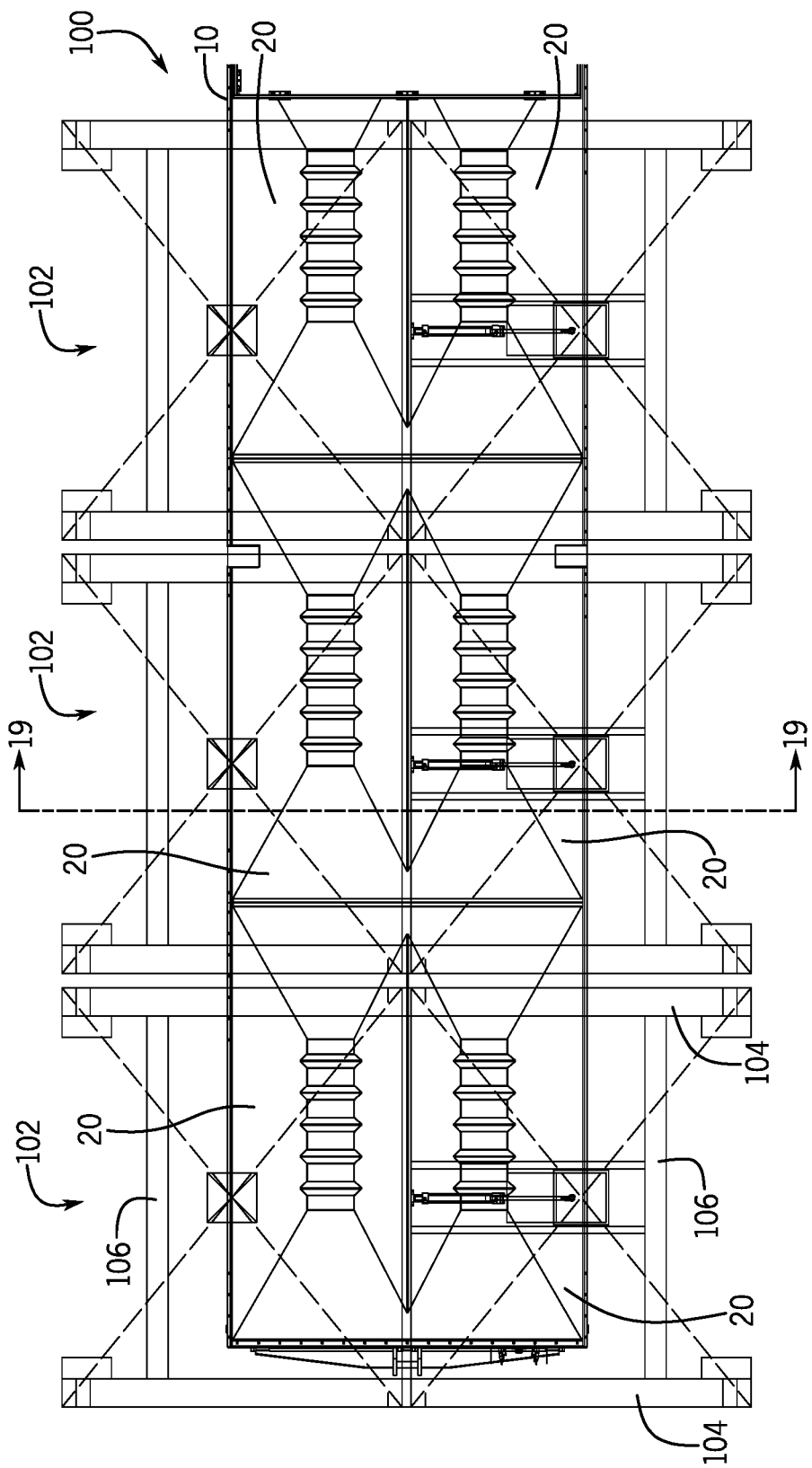
FIG. 12 is a top view of the fourth embodiment of the support frame.
Figure 13:
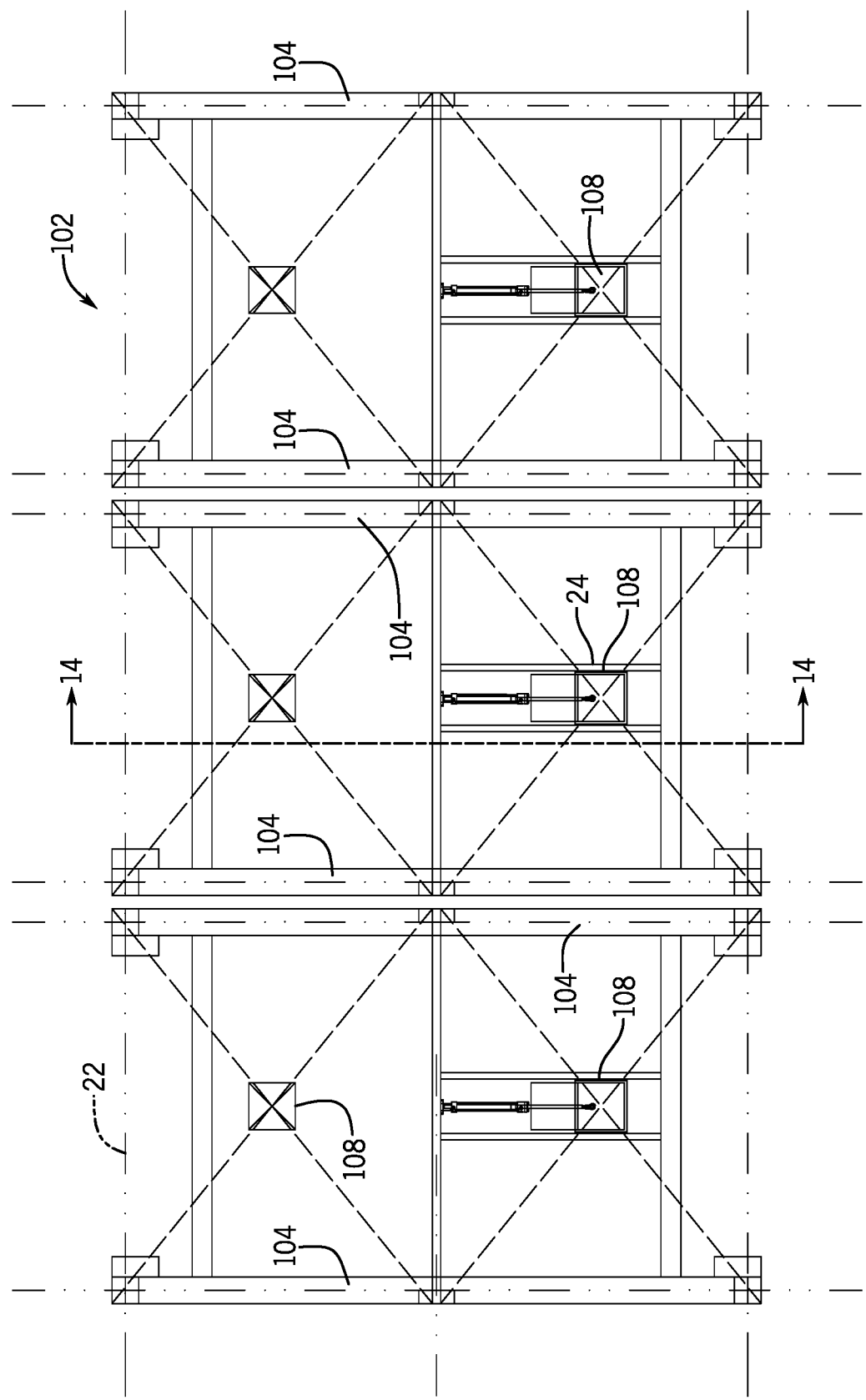
FIG. 13 is a top view illustrating the position of the storage containers relative to the T-belt conveyor.
Figure 14:
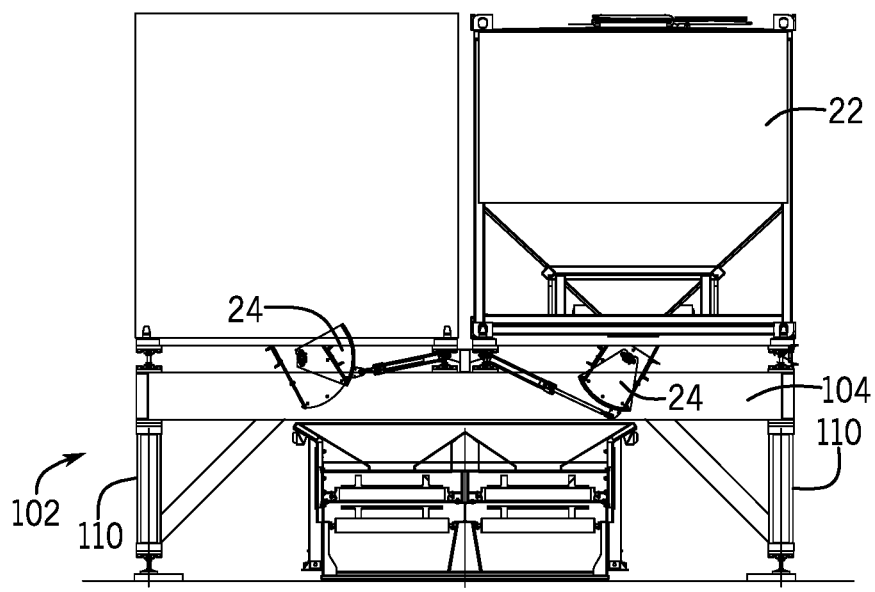
FIG. 14 is a section view taken along line 14-14 of FIG. 13.
Figure 15:
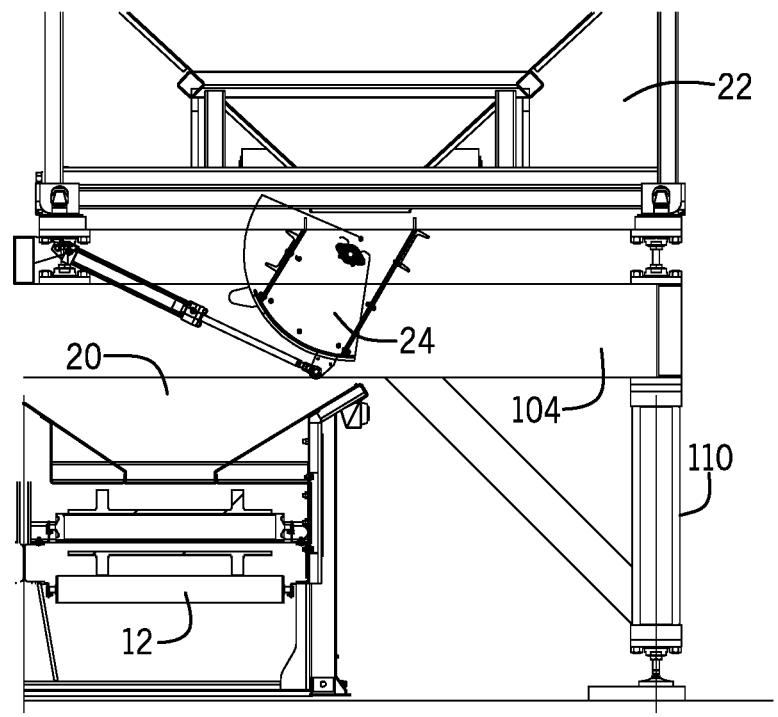
FIG. 15 is a magnified view of FIG. 14.
Figure 16:
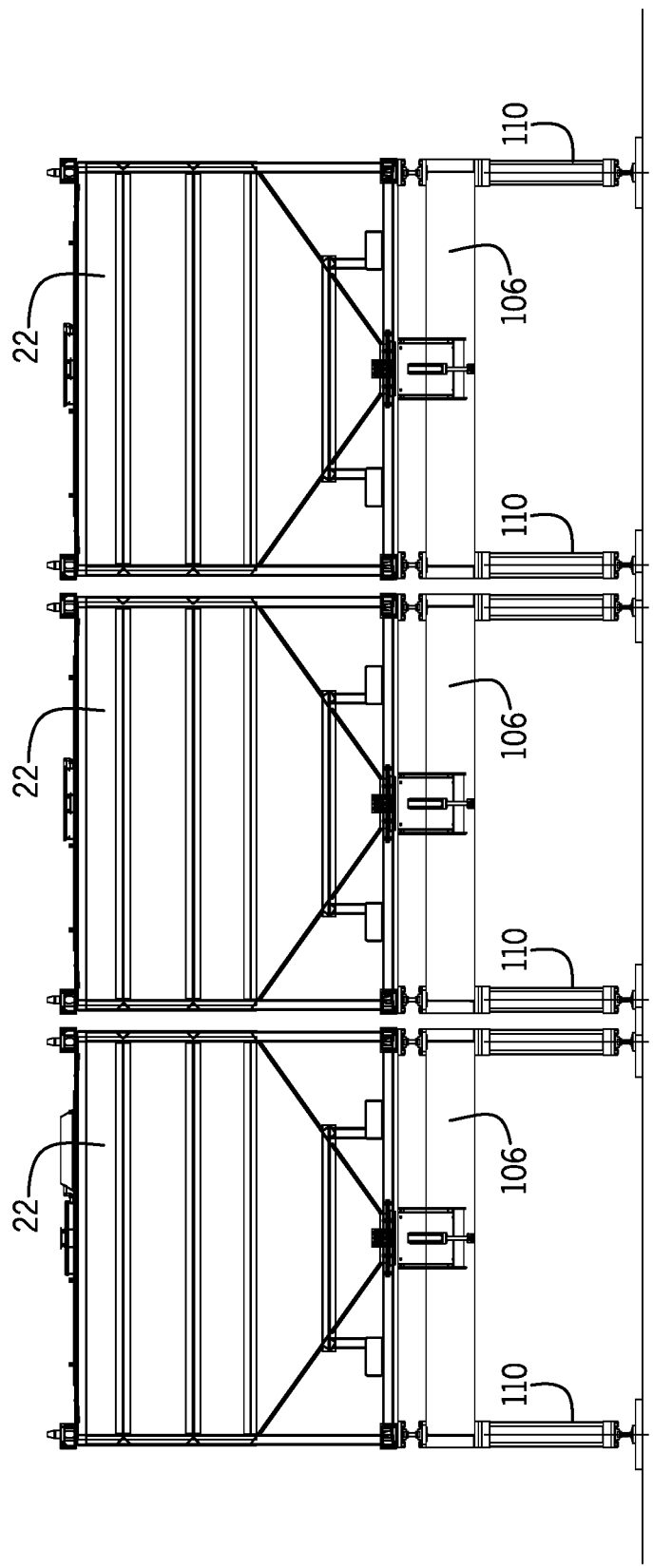
FIG. 16 is a section view of the support frame.
Figure 17:
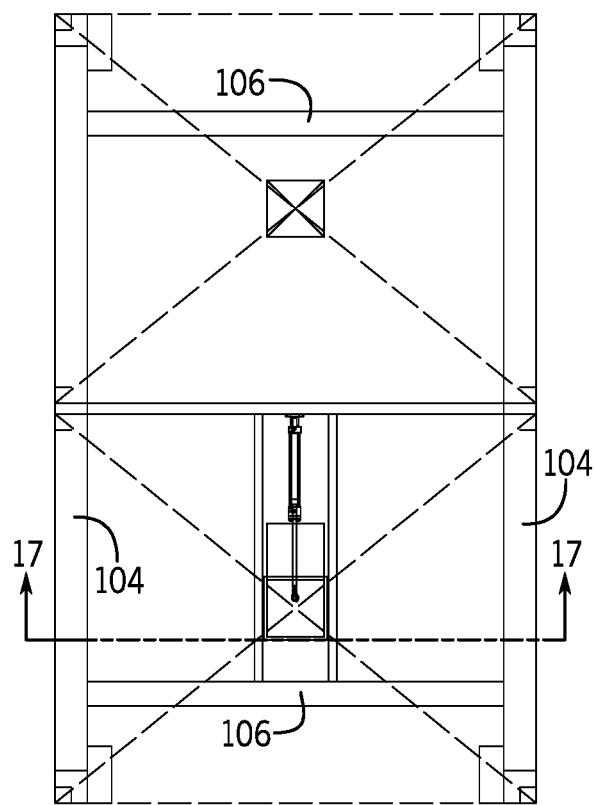
FIG. 17 is a top view of the support frame and storage containers.
Figure 18:
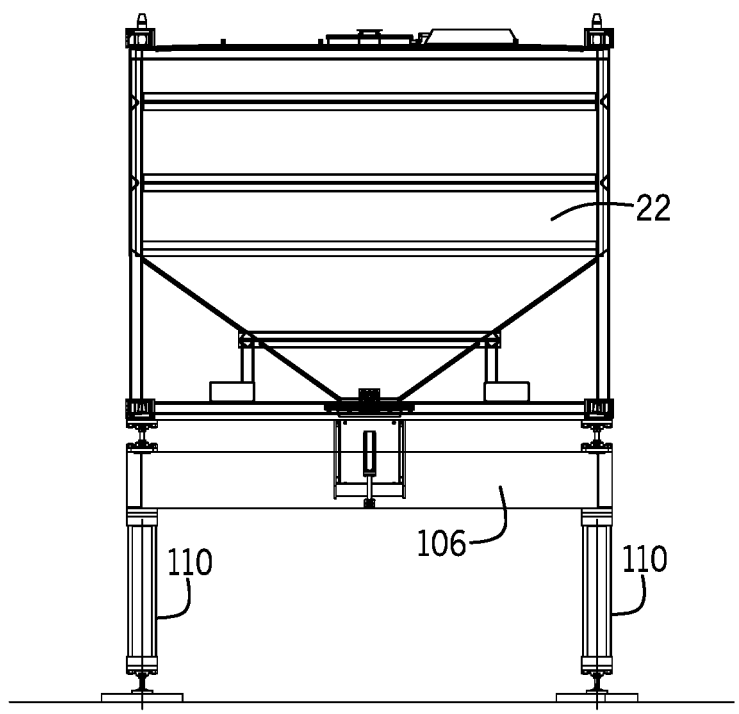
FIG. 18 is a section view of the support frame taken along line 17-17.
Figure 19:
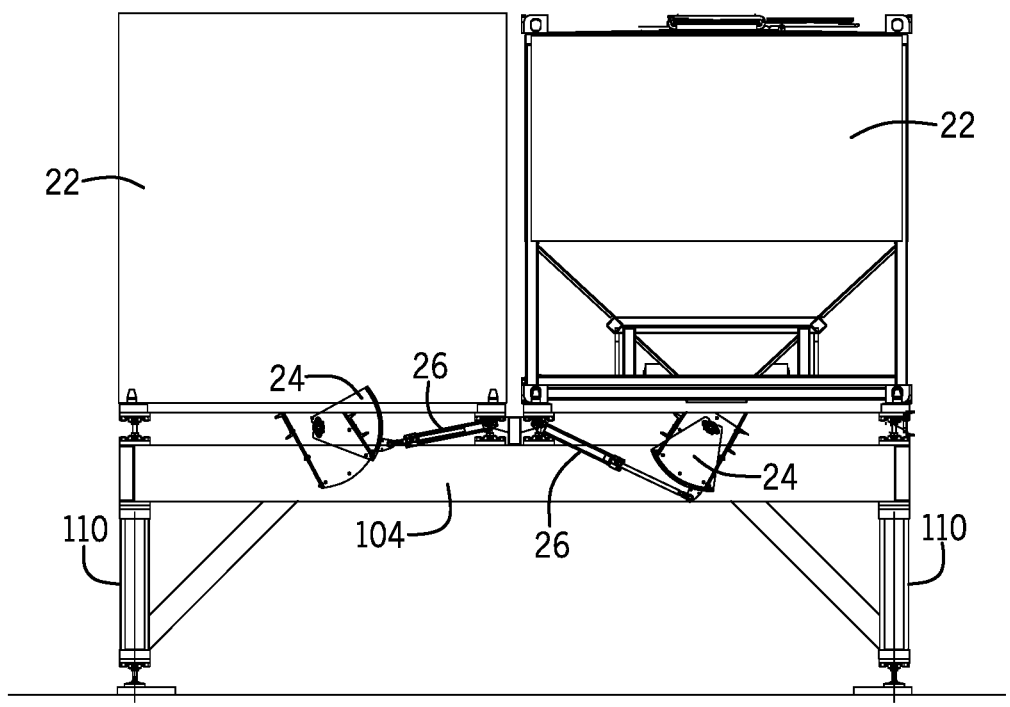
FIG. 19 is a section view taken along line 19-19 of FIG. 12.

FIGS. 11-19 illustrate yet another alternate embodiment of the support system of the present disclosure for supporting a series of intermodal storage containers 22 above a T-belt conveyor 10. As illustrated in FIG. 11, the T-belt conveyor 10 is shown aligned with six of the storage container 22 each mounted to a support frame assembly 100. As shown in FIG. 12, the support frame assembly 100 is comprised of three separate tables 102 that each span over the width of the T-belt conveyor 10. Each of the tables 102 supports a pair of storage containers 22 in a side-by-side relationship and can be separately moved and positioned. Each of the individual tables 102 includes a pair of cross supports 104 joined to each other by a pair of side beams 106. As illustrated in FIG. 13, when the storage containers 22 are mounted to the support tables 102, the discharge gate 108 of each of the containers is aligned with one of the discharge hoppers 20 of the T-belt conveyor. As in the past embodiments, a clam shell discharge gate 24 controls the flow of material from the storage container onto the T-belt conveyor 10. FIG. 14 illustrates the position of the storage containers 22 allowing the cross support 104 of each of the support tables 102. Each of the cross supports 104 is supported by an outer leg 110. As illustrated in FIG. 15, material discharged from the clam shell discharge gate is directed into the hopper 20 and onto the conveyer belt 12.

Although not shown in the drawing figures, each of the embodiments illustrated includes a control panel that controls the operation of the conveyor frame mounted discharge gate and receives information from the individual load cells that monitor the weight of the material remaining in the storage containers. In a proposed alternative design, the control panel could also control the opening and closing of the box gate located on each of the storage containers. In the embodiment shown and described, the box gate for each storage container is manually opened and closed. The control panel allows a user to selectively control the discharge rate of material from each of the storage containers by controlling flow through the conveyor frame mounted discharge gate or by adjusting conveyor belt speed, and can indicate when any one of the storage containers has been fully discharged.

Figure 20:
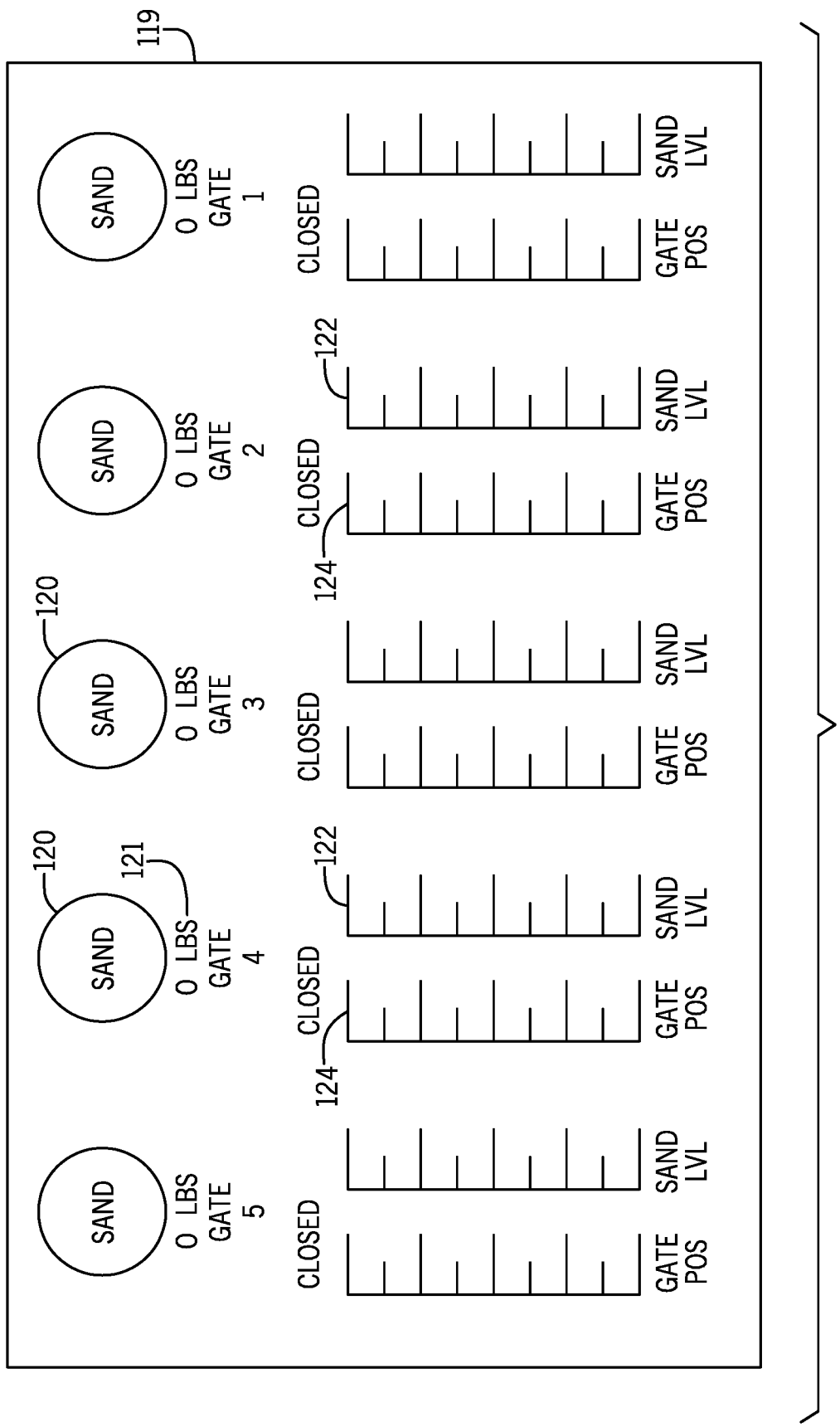
FIG. 20 is a screenshot showing the status of the storage containers.

FIG. 20 includes a representation of what an operator might see on a frame mounted touch screen control device. This touch screen information can also be transmitted to a smart device (phone, ipad, etc) or to the computer van where most of the functions of the fracking job are being monitored by the fracking crew. The touch screen display 119 includes an indicator circle 120 that includes a color indicator. When the indicator circle 120 is green, this color indicator signifies that proppant, such as sand, is in the storage container. This status could be determined by a variety of devices, such as a rotating impeller device that sense proppant in the container. If the impeller, which is in the conveyor mounted hopper, is free to turn, that means there is no proppant in that hopper, implying that the box has emptied. The indicator circle 120 would then turn red. If there is proppant in that hopper, the proppant encloses and binds the impeller from turning, so the indicator circle 120 turns green, informing the user that there is still sand in the hopper and box. In such an embodiment, the impeller is turned by a low torque electric motor and the output of that motor is sent to the control panel telling it whether the impeller is turning.

As shown in FIG. 20, the output of the load cells is used to determine the number of current pounds of sand in the container, which is numerically displayed as shown by reference number 121. In addition, estimated sand level is shown by the gauge 122 and the current position of the discharge gate between fully open and fully closed conditions is shown by the gauge 124. Other information could also be included on the touch screen display 119 as desired.

We claim:

1. A system for distributing a fracking proppant at a well site, comprising:
   a conveyor having a width defined between a first side and a second side, two conveyor belts each extending from a first end to a second end of the conveyor, and a plurality of hoppers positioned in two rows, each of the two rows being positioned above one of the two conveyor belts to direct fracking proppant onto one of the conveyor belts;
   a support frame having a width and being positioned to surround at least a portion of the conveyor, the width of the support frame being greater than the width of the conveyor; and
   a plurality of storage containers each having a width and a discharge gate centered on the width of the storage container, each storage container containing a supply of the fracking proppant, wherein the plurality of storage containers are supported on the support frame above the conveyor belts, wherein the support frame is configured such that two of the plurality of storage containers are supported side-by-side within the width of the support frame, and wherein each of the plurality of storage containers is located such that the its discharge gate is non-centered relative to one of the two rows of hoppers and the discharge gate is selectively operable to discharge the supply of fracking proppant into one of the two rows of hoppers.

2. The system of claim 1 wherein the support frame includes a plurality of cross supports that each extend past the first and second sides of the conveyor and are supported by a support leg.

3. The system of claim 2 further comprising a plurality of load cells positioned on the cross supports, wherein the plurality of load cells detect the weights of the plurality of storage containers and supply of proppant supported by the support frame.

4. The system of claim 2 wherein each of the cross supports includes a first end and a second end, wherein each of the first and second ends includes an outrigger.

5. The system of claim 4 wherein each of the outriggers includes a movable beam portion that extends from or is retracted into a center beam portion.

6. The system of claim 5 wherein the center beam portion is supported by a pair of center legs and each of the movable beam portions is supported by an outer leg.

7. The system of claim 2 wherein a length of each of the cross supports is adjustable.

8. The system of claim 1 wherein the width of the support frame is at least two times the width of one of the plurality of storage containers.

9. The system of claim 1 wherein the support frame includes a plurality of support tables each configured to support two of the storage containers, each of the support tables including a pair of cross supports each having a pair of support legs, wherein the pair of cross supports are joined by a pair of side beams such that each of the support tables are independently positionable relative to each of the other support tables.

10. The system of claim 9 further comprising an extension frame mounted to each of the support legs, the extension frame being movable to an extended position to support one of the storage containers and movable to a retracted, storage position for storage and transport.

11. A support frame for supporting a plurality of storage containers each having a discharge gate centered within the storage container and containing a supply of a fracking proppant above a conveyor having a width defined between a first side and a second side, two conveyor belts each extending from a first end to a second end of the conveyor, and a plurality of hoppers positioned in two rows, each of the rows being positioned above one of the two conveyor belts to direct fracking proppant onto one of the conveyor belts, wherein the support frame and the plurality of storage containers each have a width, respectively, the support frame comprising:
   a plurality of cross supports each configured to extend past the first and second sides of the conveyor;
   a support leg positioned on first and second ends of the cross supports; and
   at least a pair of side beams extending between the plurality of cross supports,
   wherein the support frame is configured to support two of the storage containers within the width of the support frame in a side-by-side relationship such that the discharge gate of each of the storage containers is above and non-centered relative to one of the two rows of hoppers, wherein the combined width of the two of the plurality of storage containers is less than the width of the support frame.

12. The support frame of claim 11 further comprising a plurality of load cells positioned on the cross supports, wherein the plurality of load cells are configured to detect the weight of the storage container and supply of proppant supported by the support frame.

13. The support frame of claim 11 wherein each of the cross supports includes a first end and a second end, wherein each of the first and second ends includes an outrigger.

14. The support frame of claim 13 wherein each of the outriggers includes a movable beam portion that extends from or is retracted into a center beam portion.

15. The support frame of claim 14 wherein the center beam portion is supported by a pair of center legs and each of the movable beam portions is supported by an outer leg.

16. The support frame of claim 11 wherein the width of the support frame is at least two times the width of one of the plurality of storage containers.

17. The support frame of claim 11 wherein the support frame includes a plurality of support tables each configured to support two of the storage containers, each of the support tables including two of the cross supports each having two of the support legs, wherein the two of the cross supports are joined by two of the side beams such that each of the support tables is independently positionable relative to each of the other support tables.

18. The support frame of claim 17 further comprising an extension frame mounted to each of support legs, the extension frame being movable to an extended position to support one of the storage containers and movable to a retracted, storage position for storage and transport.

* * * * *